United States Patent [19]
Clements

[11] Patent Number: 6,125,772
[45] Date of Patent: Oct. 3, 2000

[54] PLATFORM APPARATUS

[76] Inventor: Neil P. Clements, 25 Abbots Leigh, Southwater, Horsham West Sussex RH13 7HX, United Kingdom

[21] Appl. No.: 09/041,424

[22] Filed: Mar. 12, 1998

[51] Int. Cl.[7] .................................................. A47B 3/00
[52] U.S. Cl. .............................. 108/129; 108/115; 108/44
[58] Field of Search .................................. 108/120, 129, 108/125, 166, 167, 169, 173, 174, 12, 19, 44; 248/188, 188.8, 439

[56] References Cited

U.S. PATENT DOCUMENTS

| | | | |
|---|---|---|---|
| 2,715,558 | 8/1955 | Bell | 108/129 X |
| 2,885,803 | 5/1959 | Wood | 108/174 X |
| 3,046,595 | 7/1962 | Johansson et al. | 108/166 X |
| 3,334,930 | 8/1967 | Larson | 108/125 X |
| 3,709,159 | 1/1973 | Oglesby, Jr. | 108/129 X |
| 4,392,437 | 7/1983 | Wallace | 108/129 X |
| 4,718,630 | 1/1988 | Richard | 108/19 X |
| 4,735,392 | 4/1988 | Farmer | 248/439 |
| 5,109,778 | 5/1992 | Berkowitz et al. | 248/439 X |

*Primary Examiner*—Jose V. Chen

[57] ABSTRACT

A new platform apparatus for installation in the rear compartment of a vehicle. The inventive device includes a platform member. An outer periphery of the platform member defines a border extending therearound. The border defines an inner area and an outer area. The inner area is inside the border while the outer area is outside the border. A pair of first support legs are pivotally coupled to the lower surface of the platform member. A pair of second support legs are pivotally and slidably coupled to the lower surface of the platform member. Each of the second support legs is pivotally positionable along an arc extending around a second corner formed by a side and the rear of the platform member. Each of the second support legs is slidably positionable between a retracted position and an extended position, such that the second support legs are located in the inner area when in the retracted position and are located in the outer area when in the extended position.

20 Claims, 3 Drawing Sheets

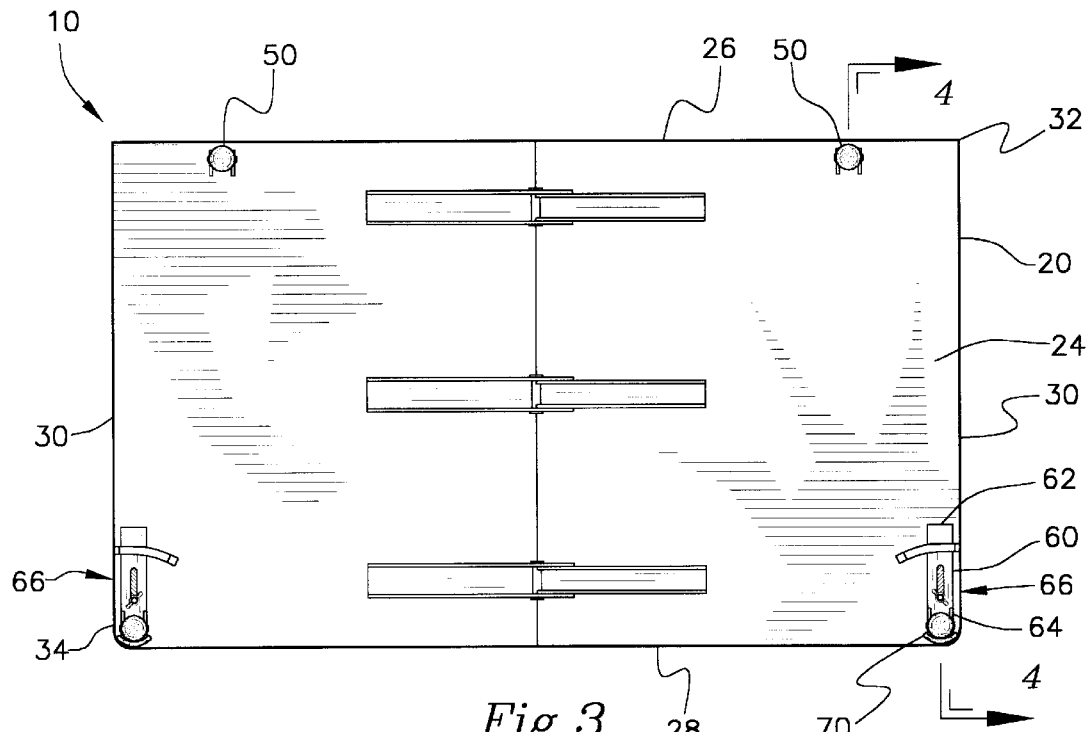
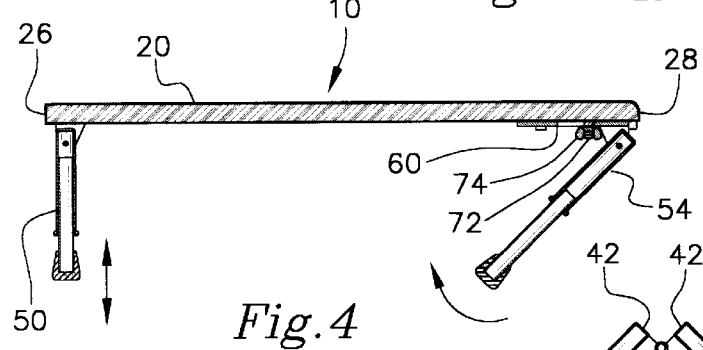
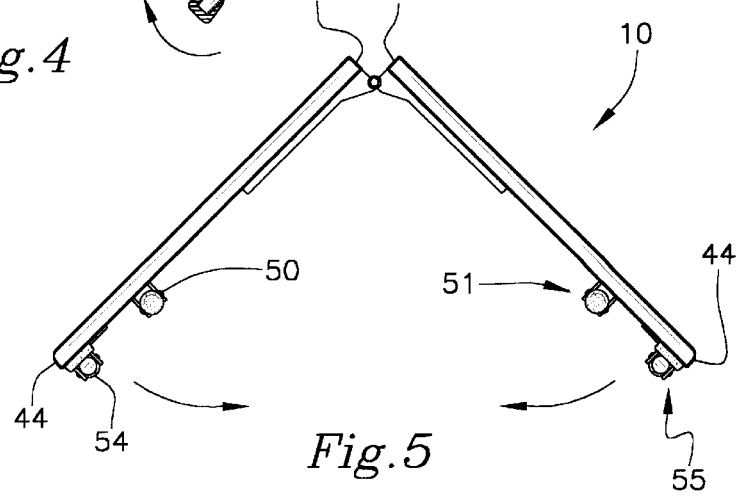

PLATFORM APPARATUS

BACKGROUND OF THE INVENTION

1. Field of the Invention

The present invention relates to vehicle shelf apparatuses and more particularly pertains to a new platform apparatus for installation in the rear compartment of a vehicle.

2. Description of the Prior Art

The use of vehicle shelf apparatuses is known in the prior art. More specifically, vehicle shelf apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle shelf apparatuses include U. S. Pat. No. 5,090,337; U.S. Pat. No. 5,427,033; U.S. Pat. No. Des. 347,611; U.S. Pat. No. 3,946,678; U.S. Pat. No. 5,331,904; and U.S. Pat. No. 4,118,087.

While these devices fulfill their respective, particular objectives and requirements, the aforementioned patents do not disclose a new platform apparatus. The inventive device includes a platform member. An outer periphery of the platform member defines a border extending therearound. The border defines an inner area and an outer area. The inner area is inside the border while the outer area is outside the border. A pair of first support legs are pivotally coupled to the lower surface of the platform member. A pair of second support legs are pivotally and slidably coupled to the lower surface of the platform member. Each of the second support legs is pivotally positionable along an arc extending around a second corner formed by a side and the rear of the platform member. Each of the second support legs is slidably positionable between a retracted position and an extended position, such that the second support legs are located in the inner area when in the retracted position and are located in the outer area when in the extended position.

In these respects, the platform apparatus according to the present invention substantially departs from the conventional concepts and designs of the prior art, and in so doing provides an apparatus primarily developed for the purpose of installation in the rear compartment of a vehicle.

SUMMARY OF THE INVENTION

In view of the foregoing disadvantages inherent in the known types of vehicle shelf apparatuses now present in the prior art, the present invention provides a new platform apparatus construction wherein the same can be utilized for installation in the rear compartment of a vehicle.

The general purpose of the present invention, which will be described subsequently in greater detail, is to provide a new platform apparatus and method which has many of the advantages of the vehicle shelf apparatuses mentioned heretofore and many novel features that result in a new platform apparatus which is not anticipated, rendered obvious, suggested, or even implied by any of the prior art vehicle shelf apparatuses, either alone or in any combination thereof.

To attain this, the present invention generally comprises a platform member. An outer periphery of the platform member defines a border extending therearound. The border defines an inner area and an outer area. The inner area is inside the border while the outer area is outside the border. A pair of first support legs are pivotally coupled to the lower surface of the platform member. A pair of second support legs are pivotally and slidably coupled to the lower surface of the platform member. Each of the second support legs is pivotally positionable along an arc extending around a second corner formed by a side and the rear of the platform member. Each of the second support legs is slidably positionable between a retracted position and an extended position, such that the second support legs are located in the inner area when in the retracted position and are located in the outer area when in the extended position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new platform apparatus and method which has many of the advantages of the vehicle shelf apparatuses mentioned heretofore and many novel features that result in a new platform apparatus which is not anticipated, rendered obvious, suggested, or even implied by any of the prior art vehicle shelf apparatuses, either alone or in any combination thereof.

It is another object of the present invention to provide a new platform apparatus which may be easily and efficiently manufactured and marketed.

It is a further object of the present invention to provide a new platform apparatus which is of a durable and reliable construction.

An even further object of the present invention is to provide a new platform apparatus which is susceptible of a low cost of manufacture with regard to both materials and labor, and which accordingly is then susceptible of low prices of sale to the consuming public, thereby making such platform apparatus economically available to the buying public.

Still yet another object of the present invention is to provide a new platform apparatus which provides in the apparatuses and methods of the prior art some of the advantages thereof, while simultaneously overcoming some of the disadvantages normally associated therewith.

Still another object of the present invention is to provide a new platform apparatus for installation in the rear compartment of a vehicle.

Yet another object of the present invention is to provide a new platform apparatus which includes a platform member. An outer periphery of the platform member defines a border extending therearound. The border defines an inner area and an outer area. The inner area is inside the border while the outer area is outside the border. A pair of first support legs are pivotally coupled to the lower surface of the platform member. A pair of second support legs are pivotally and slidably coupled to the lower surface of the platform member. Each of the second support legs is pivotally positionable along an arc extending around a second corner formed by a side and the rear of the platform member. Each of the second support legs is slidably positionable between a retracted position and an extended position, such that the second support legs are located in the inner area when in the retracted position and are located in the outer area when in the extended position.

Still yet another object of the present invention is to provide a new platform apparatus that provides increased cargo storing capacity in the rear compartment of a vehicle.

Even still another object of the present invention is to provide a new platform apparatus that is foldable for easy insertion through a confined opening or hatch back.

Even still yet another object of the present invention is to provide a new platform apparatus that has collapsible legs and is foldable in half for convenient storage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention particularly showing the lower surface of the platform apparatus.

FIG. 4 is a cross-sectional view of the present invention taken from Line 4—4 of FIG. 3.

FIG. 5 is a side view of the present invention illustrating the support legs in the retracted position and the pivotal coupling of the platform portions.

DESCRIPTION OF THE PREFERRED EMBODIMENT

Figure 1:
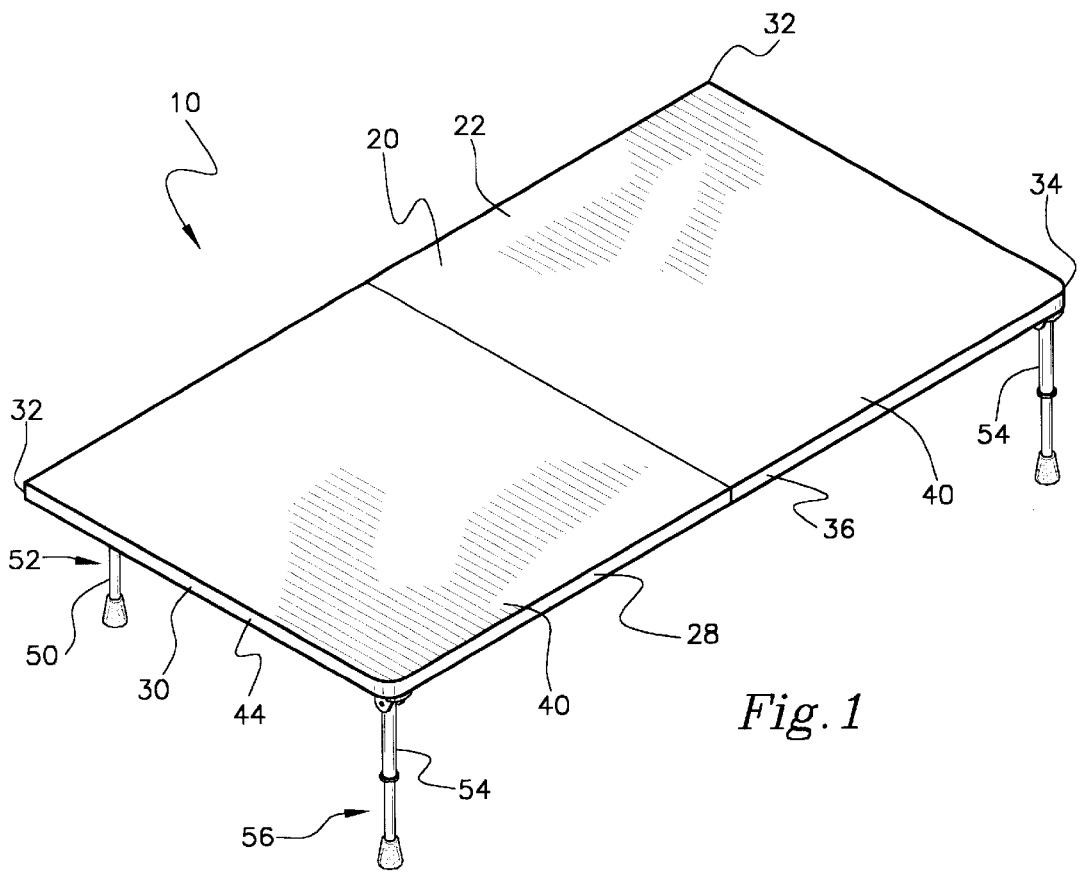
FIG. 1 is a perspective view of a new platform apparatus according to the present invention.

With reference now to the drawings, and in particular to FIGS. 1 through 6 thereof, a new platform apparatus embodying the principles and concepts of the present invention and generally designated by the reference numeral 10 will be described.

As best illustrated in FIGS. 1 through 6, the platform apparatus 10 is designed for installation in the rear compartment of a hatchback or station wagon type vehicle. The platform apparatus 10 comprises a platform member 20. An outer periphery 36 of the platform member 20 defines a border that extends therearound. The border defines an inner area and an outer area. The inner area is inside the border while the outer area is outside the border. A pair of first support legs 50 are pivotally coupled to the lower surface 24 of the platform member 20. A pair of second support legs 54 are pivotally and slidably coupled to the lower surface 24 of the platform member 20. Each of the second support legs 54 is pivotally positionable along an arc extending around a second corner 34 formed by a side 30 and the rear 28 of the platform member 20. Each of the second support legs 54 is slidably positionable between a retracted position 66 and an extended position 68, such that the second support legs 54 are located in the inner area when in the retracted position 66 and are located in the outer area when in the extended position 68.

The platform member 20 includes an upper surface 22, a lower surface 24, a front 26, a rear 28, a pair of sides 30, and an outer periphery 36. The outer periphery 36 defines a border that extends around the outer periphery 36. An inner area and an outer area are defined by the border. The inner area is inside the border. The outer area is outside the border. Preferably, the platform member 20 is rectangular in shape. Also preferably, the upper and lower surfaces 22, 24 are substantially planar.

A pair of first support legs 50 extend from the lower surface 24 of the platform member 20. The first support legs 50 are pivotally coupled to the lower surface 24 of the platform member 20 to permit positioning of the first support legs 50 between a deployed position 52 and a retracted position 51. The first support legs 50 are substantially perpendicular to the lower surface 24 of the platform member 20 when positioned in the deployed position 52. The first support legs 50 are substantially parallel to the lower surface 24 of the platform member 20 when positioned in the retracted position 51. This permits more compact storage when not in use as well as permits easier insertion into the rear compartment of a vehicle.

A pair of second support legs 54 extend from the lower surface 24 of the platform member 20. The second support legs 54 are pivotally and slidably coupled to the lower surface 24 of the platform member 20. Each of the second support legs 54 is pivotally positionable along an arc extending around a second corner 34 formed by a side 30 and the rear 28 of the platform member 20.

Figure 6:
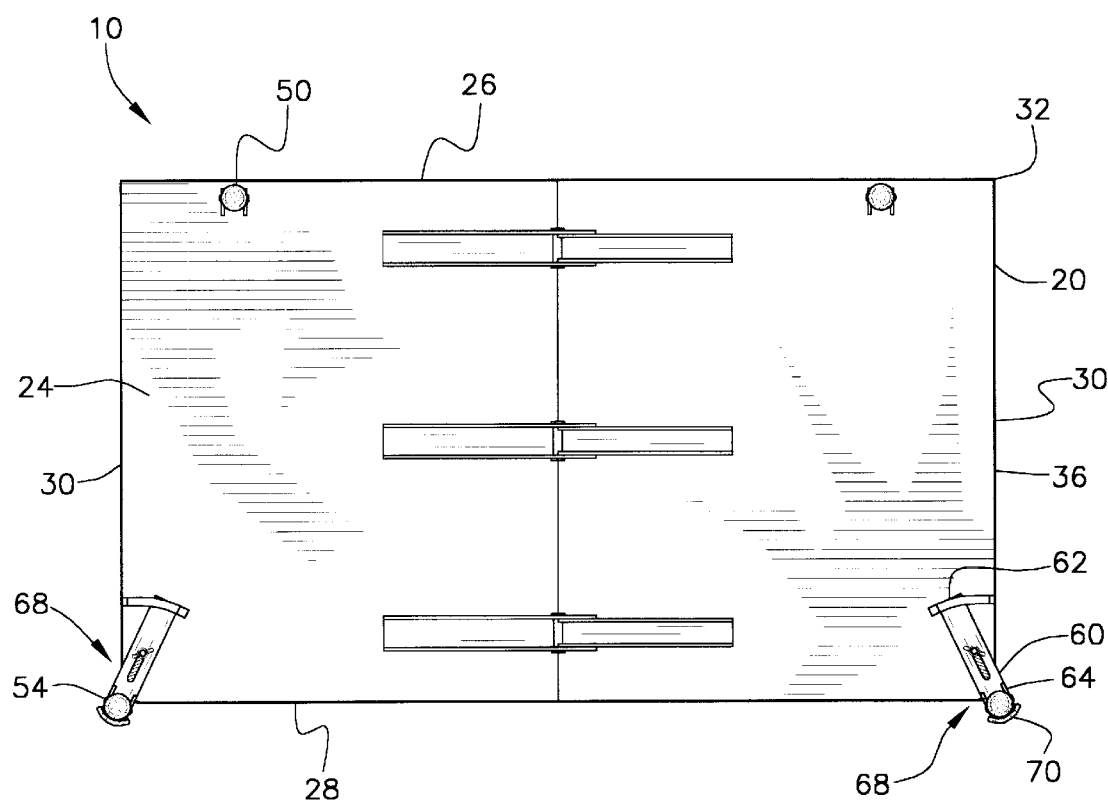
FIG. 6 is a side view of the present invention particularly illustrating the bracket members in an extended position.

Each of the second support legs 54 is slidably positionable between a retracted position 66 and an extended position 68. As shown in FIGS. 3 and 6, the second support legs 54 are located in the inner area when in the retracted position 66 and are located in the outer area when in the extended position 68.

Preferably, the platform apparatus 10 further comprises a pair of bracket members 60. A corresponding bracket member 60 couples each second support leg 54 to the lower surface 24 of the platform member 20. As illustrated in FIGS. 3 and 6, each bracket member 60 is pivotally and slidably coupled to the lower surface 24 of the platform member 20. Each second support leg 54 is pivotally coupled to an associated bracket member 60 to permit positioning of the second support legs 54 between a deployed position 56 and a retracted position 55. The second support legs 54 are substantially perpendicular to the lower surface of the platform member when positioned in the deployed position 56. The second support legs 54 are substantially parallel to the lower surface 24 of the platform member 20 when positioned in the retracted position 55.

Preferably, as shown in FIG. 6, each of the bracket members 60 has an inner end 62 and an outer end 64. Each inner end 62 is positioned towards a midpoint on the corresponding side 30 of the platform member 20.

Ideally, each of the bracket members 60 is pivotally positionable such that each inner end 62 of a bracket member 60 is positionable along an arc extending from a position adjacent the rear 28 of the platform member 20 towards a position adjacent the associated side 30 of the platform member 20.

Also ideally, as illustrated in FIGS. 3 and 6, each of the bracket members 60 is slidably positionable between a retracted position 66 and an extended position 68. The second support legs 54 are located in the inner area when the bracket members 60 are in the retracted position 66. The second support legs 54 are located in the outer area when the bracket members 60 are in the extended position 68.

A threaded bolt 72 and wing nut 74 is the preferred means of coupling each bracket member 60 to the platform member 20. This permits adjustment of the position of the bracket members 60 without the need for tools.

Ideally, as shown in FIG. 3, each outer end 64 of the bracket members 60 has a resting portion 70 that rests against a rear wall of the rear compartment of a vehicle to hold the platform apparatus 10 securely in place when the bracket members 60 are in an extended position 68. Even more ideally, the resting portions 70 comprise a resiliently deformable material such as rubber or plastic.

Preferably, the platform member 20 includes a pair of first corners 32 and a pair of second corners 34. Ideally, each of the second corners 34 is rounded for fitting snugly to the contours of the rear compartment of a vehicle.

Also preferably, the platform member 20 further comprises a pair of generally rectangular platform portions 40. Each of the platform portions 40 includes a portion of the upper surface 22 of the platform member 20 and a portion of the lower surface 24 of the platform member 20. Each of the platform portions 40 has proximal and distal side ends 42, 44. Each of the side ends 42, 44 of the platform portions 40 extends between the front 26 and the rear 28 of the platform member 20. Each of the distal side ends 44 forms an associated side 30 of the platform member 20.

In such an embodiment, the platform portions 40 are pivotally coupled together at their proximal side ends 42 so that the platform apparatus 10 is foldably collapsible for easy storage as well as for permitting insertion of the platform apparatus 10 through smaller sized openings into the rear compartments of vehicles. Ideally, the platform portions 40 are coupled together by a plurality of hinges. Even more ideally, as shown in FIG. 5, the position of the pivot point of the hinges is below and spaced apart from the lower surface 24 of the platform member 20 to give the platform apparatus 10 increased strength.

Each of the platform portions 40 has a length that is defined between its respective distal and proximal side ends 42, 44. Ideally, as shown in FIG. 3, the first support legs 50 are positioned adjacent the front 26 of the platform member 20. The distance of each first support leg 50 from the nearest corresponding side 30 of the platform member 20 is between more than about one-fifth and less than about one-half of the length of its respective platform portion 40.

Preferably, the first and second support legs 50, 54 are telescopically extendible to permit adjustment of the height of the platform member 20 when in use. In such an embodiment, each of the first and second support legs 50, 54 comprises a tubular elongate base portion 58 and an extension portion 59. The extension portions 59 are telescopically received into the base portions 58.

Figure 2:
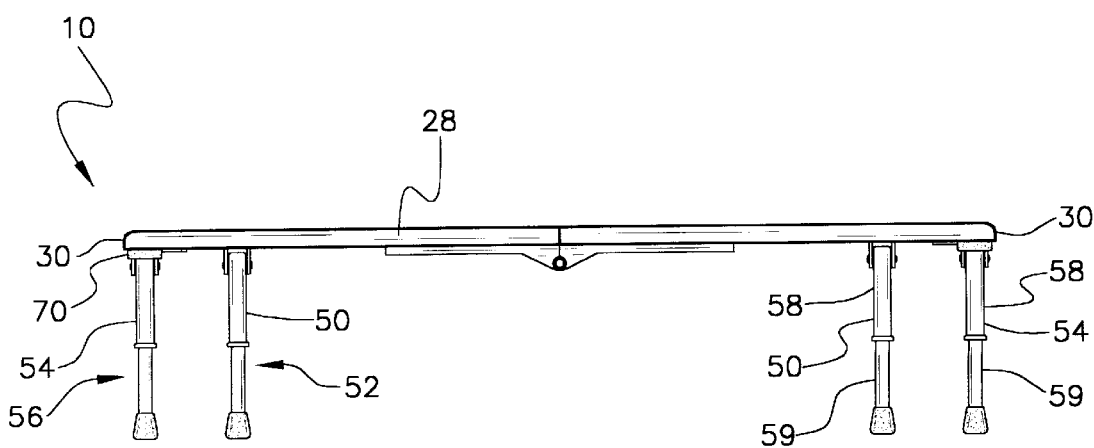
FIG. 2 is a side view of the present invention with the support legs in the deployed position.

In use, the first and second support legs 50, 54 are placed in a retracted position 51, 55. As illustrated in FIG. 5, the platform portions 40 are partially collapsed along their proximal side ends 42 to permit easier insertion into the rear compartment of a vehicle. The platform apparatus 10 is positioned in the rear compartment of the vehicle with the front 26 of the platform member 20 facing towards the front of the vehicle. As shown in FIG. 2, the platform portions 40 are unfolded such that the upper surface 22 of the platform member 20 is substantially planar. The first and second support legs 50, 54 are placed in the deployed position 52, 56. The height of the first and second support legs 50, 54 is adjusted. As illustrated in FIG. 6, the bracket members 60 may be pivotally and slidably adjusted such that the resting portions 70 of the bracket members 60 rest against a rear wall of the rear compartment of the vehicle to hold the platform apparatus 10 securely in place. Items are placed on the upper surface 22 of the platform member 20 and beneath the lower surface 24 of the platform member 20 for storage.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A platform apparatus for installation in a rear compartment of a vehicle, said platform apparatus being for resting objects thereon, said platform apparatus comprising:

a platform member having an upper surface, a lower surface, a front, a rear, a pair of sides, and an outer periphery;

said outer periphery defining a border extending therearound, said border defining an inner area and an outer area, said inner area being inside said border, said outer area being outside said border;

a pair of first and second support legs extending from said lower surface of said platform member, said first support legs being pivotally coupled to said lower surface of said platform member;

said second support legs being pivotally coupled to said lower surface of said platform member such that each of said second support legs is pivotally positionable along an arc extending around a corner formed by said side and said rear of said platform member; and each of said second support legs being slidably coupled to said lower surface of said platform member such that each of said second support legs is slidably positionable between a retracted position and an extended position, such that said second support legs are located in said inner area when in said retracted position, and such that said second support legs are located in said outer area when in said extended position.

2. The platform apparatus of claim 1, further comprising a pair of bracket members, wherein a said bracket member couples each said second support leg to said lower surface of said platform member, each bracket member being pivotally and slidably coupled to said lower surface of said platform member, each of said bracket members having an inner end and an outer end, each said inner end being positioned towards a midpoint on said sides of said platform member.

3. The platform apparatus of claim 2, wherein each of said bracket members is pivotally positionable, such that said inner end of said bracket member is positionable along an arc extending from a position adjacent said rear of said platform member towards a position adjacent an associated said side of said platform member.

4. The platform apparatus of claim 2, wherein each of said bracket members is slidably positionable between a retracted position and an extended position, such that said second support legs are located in said inner area when said bracket members are in said retracted position, and such that said second support legs are located in said outer area when said bracket members are in said extended position.

5. The platform apparatus of claim 2, wherein each said outer end of said bracket members has a resting portion being for resting against a rear wall of a rear compartment of said vehicle.

6. The platform apparatus of claim 5, wherein said resting portion comprises a resiliently deformable material.

7. The platform apparatus of claim 1, wherein said platform member further comprises a pair of first corners and a pair of second corners, each of said second corners being rounded.

8. The platform apparatus of claim 1, wherein said platform member further comprises a pair of rectangular platform portions, wherein each of said platform portions includes a portion of said upper surface of said platform member and a portion of said lower surface of said platform member, each of said platform portions having proximal and distal side ends, each of said side ends of said platform portions extending between said front and said rear of said platform member, each of said distal side ends forming an associated said side of said platform member, said platform portions being pivotally coupled together at their said proximal side ends.

9. The platform apparatus of claim 8, wherein each of said platform portions includes first and second support legs being downwardly extended from a corresponding said portion of said lower surface of said platform member.

10. The platform apparatus of claim 9, wherein each of said platform portions has a length being defined between its respective distal and proximal side ends, said first support legs being positioned adjacent said front of said platform member, wherein the distance of each said first support leg from each said side of said platform member is between more than about one-fifth and less than about one-half of said length of its respective platform portion.

11. The platform apparatus of claim 1, wherein said first and second support legs are telescopically extendable.

12. A platform apparatus for installation in a rear compartment of a vehicle, said platform apparatus being for resting objects thereon, said platform apparatus comprising:

a platform member being generally rectangular and having a substantially planar upper surface, a substantially planar lower surface, a front, a rear, a pair of sides, a pair of first corners, a pair of second corners, a pair of generally rectangular platform portions, and an outer periphery;

each of said second corners being rounded;

wherein each of said platform portions includes a portion of said upper surface of said platform member and a portion of said lower surface of said platform member;

each of said platform portions having proximal and distal side ends, each of said side ends of said platform portions extending between said front and said rear of said platform member, each of said distal side ends forming an associated side of said platform member, said platform portions being pivotally coupled together at their said proximal side ends, each of said platform portions having a length being defined between its respective distal and proximal side ends;

said outer periphery of said platform member defining a border extending therearound, said border defining an inner area and an outer area, said inner area being inside said border, said outer area being outside said border;

each of said platform portions including first and a second support legs being downwardly extended from said portion of said lower surface of said platform member;

said first and second support legs being telescopically extendable;

each of said first support legs being pivotally coupled to said lower surface of said platform member to permit positioning of said first support legs between a deployed position and a retracted position, wherein said legs are substantially perpendicular to said lower surface of said platform member when positioned in said deployed position, said legs being substantially parallel to said lower surface of said platform member when positioned in said retracted position;

said first support legs being positioned adjacent said front side of said platform member, wherein the distance of each said first support leg from each said side of said platform member is between more than about one-fifth and less than about one-half of said length of its respective platform portion;

a pair of bracket members being coupled to said lower surface of said platform member near said second corners of said platform member, each of said bracket members having an inner end and an outer end, each said inner end being positioned towards a midpoint on said sides of said platform member;

each of said second support legs being pivotally coupled to an associated bracket member to permit positioning of said second support legs between a deployed position and a retracted position, wherein said legs are substantially perpendicular to said lower surface of said platform member when positioned in said deployed position, said legs being substantially parallel to said lower surface of said platform member when positioned in said retracted position;

each of said bracket members being pivotally coupled to said platform member to permit pivotal positioning of each of said inner ends of said bracket members along an arc extending from a position adjacent said rear of said platform member towards a position adjacent an associated said side of said platform member;

each of said bracket members being slidably coupled to said platform members to permit positioning of said bracket members between a retracted position and an extended position such that said second support legs are located in said inner area when said bracket members are in said retracted position, and such that said second support legs are located in said outer area when said bracket members are in said extended position;

each said outer end of said bracket members having a resting portion for resting against a rear wall of a rear compartment of said vehicle; and wherein said resting portion comprises a resiliently deformable material.

13. A platform apparatus for installation in a rear compartment of a vehicle, said platform apparatus being for resting objects thereon, said platform apparatus comprising:

a platform member having an upper surface, a lower surface, a front, a rear, a pair of sides, and an outer periphery;

said outer periphery defining a border extending therearound, said border defining an inner area and an outer area, said inner area being inside said border, said outer area being outside said border;

a pair of first and second support legs extending from said lower surface of said platform member, said first support legs being pivotally coupled to said lower surface of said platform member;

a pair of bracket members being pivotally coupled to said lower surface of said platform member, said second support legs being coupled to said bracket members, each of said second support legs being adapted for pivotal positioning along an arc extending around a corner formed by said side and said rear of said platform member; and each of said bracket members being slidably coupled to said lower surface of said platform member, each of said second support legs being adapted for slidable positioning between a retracted position and an extended position, such that said second support legs are located in said inner area when in said retracted position, and such that said second support legs are located in said outer area when in said extended position.

14. The platform apparatus of claim 13, wherein each of said bracket members has an inner end and an outer end, each said inner end being positioned towards a midpoint on said sides of said platform member.

15. The platform apparatus of claim 14, wherein each of said bracket members is pivotally positionable such that said inner end of said bracket member is positionable along an arc extending from a position adjacent said rear of said platform member towards a position adjacent an associated said side of said platform member.

16. The platform apparatus of claim 14, wherein each of said bracket members is slidably positionable between a retracted position and an extended position, such that said second support legs are located in said inner area when said bracket members are in said retracted position, and such that said second support legs are located in said outer area when said bracket members are in said extended position.

17. The platform apparatus of claim 13, wherein said platform member further comprises a pair of first corners and a pair of second corners, each of said second corners being rounded.

18. The platform apparatus of claim 13, wherein said platform member further comprises a pair of rectangular platform portions, wherein each of said platform portions includes a portion of said upper surface of said platform member and a portion of said lower surface of said platform member, each of said platform portions having proximal and distal side ends, each of said side ends of said platform portions extending between said front and said rear of said platform member, each of said distal side ends forming an associated said side of said platform member, said platform portions being pivotally coupled together at their said proximal side ends.

19. The platform apparatus of claim 18, wherein each of said platform portions includes first and second support legs being downwardly extended from a corresponding said portion of said lower surface of said platform member.

20. The platform apparatus of claim 19, wherein each of said platform portions has a length being defined between its respective distal and proximal side ends, said first support legs being positioned adjacent said front of said platform member, wherein the distance of each said first support leg from each said side of said platform member is between more than about one-fifth and less than about one-half of said length of its respective platform portion.

* * * * *